Aug. 31, 1937.   S. McCURDY   2,091,869
COMPARTMENT BOX CAR
Filed Feb. 3, 1937   5 Sheets-Sheet 1
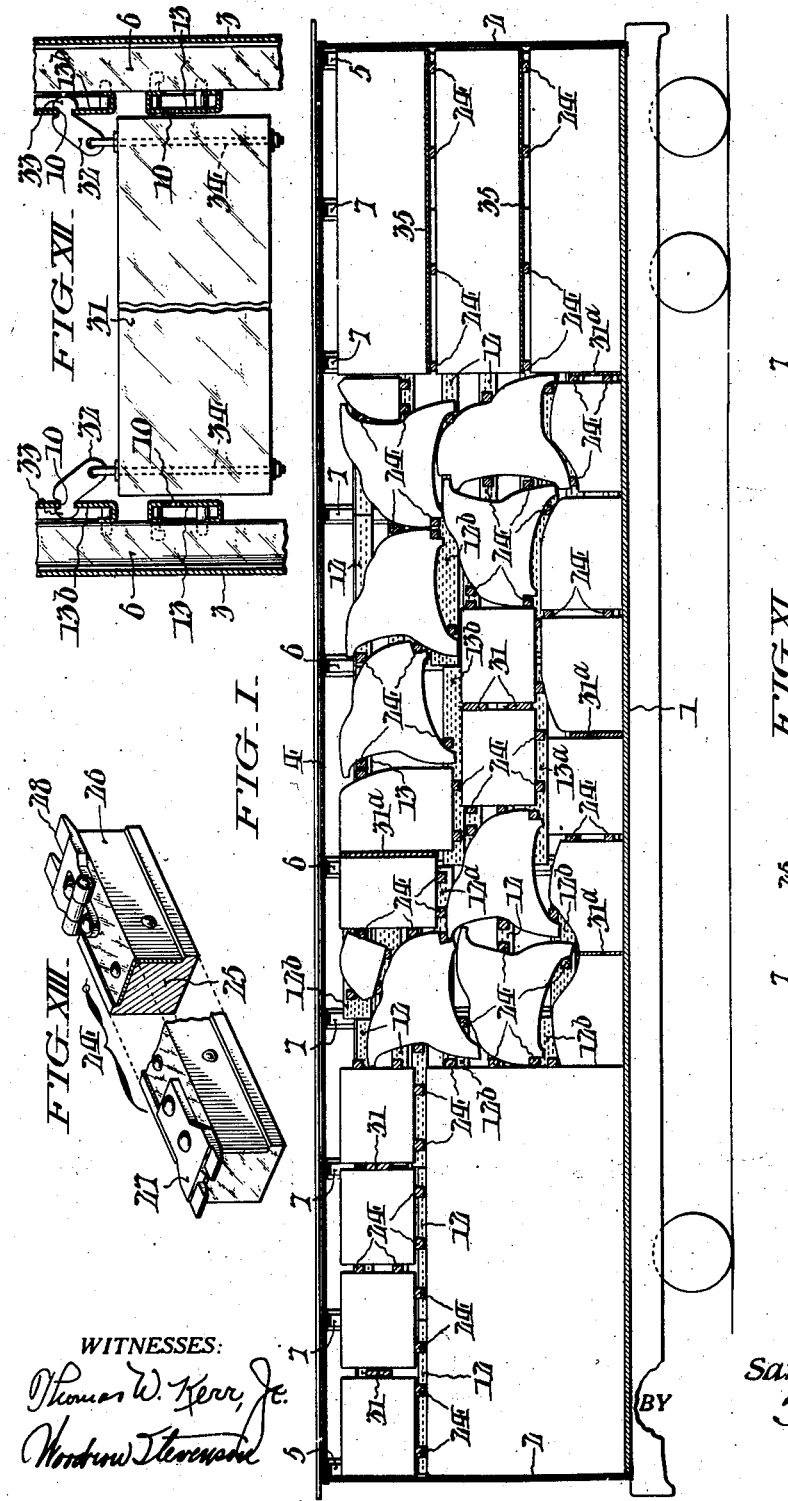
INVENTOR:
Samuel McCurdy,
Fraley Paul
ATTORNEYS.

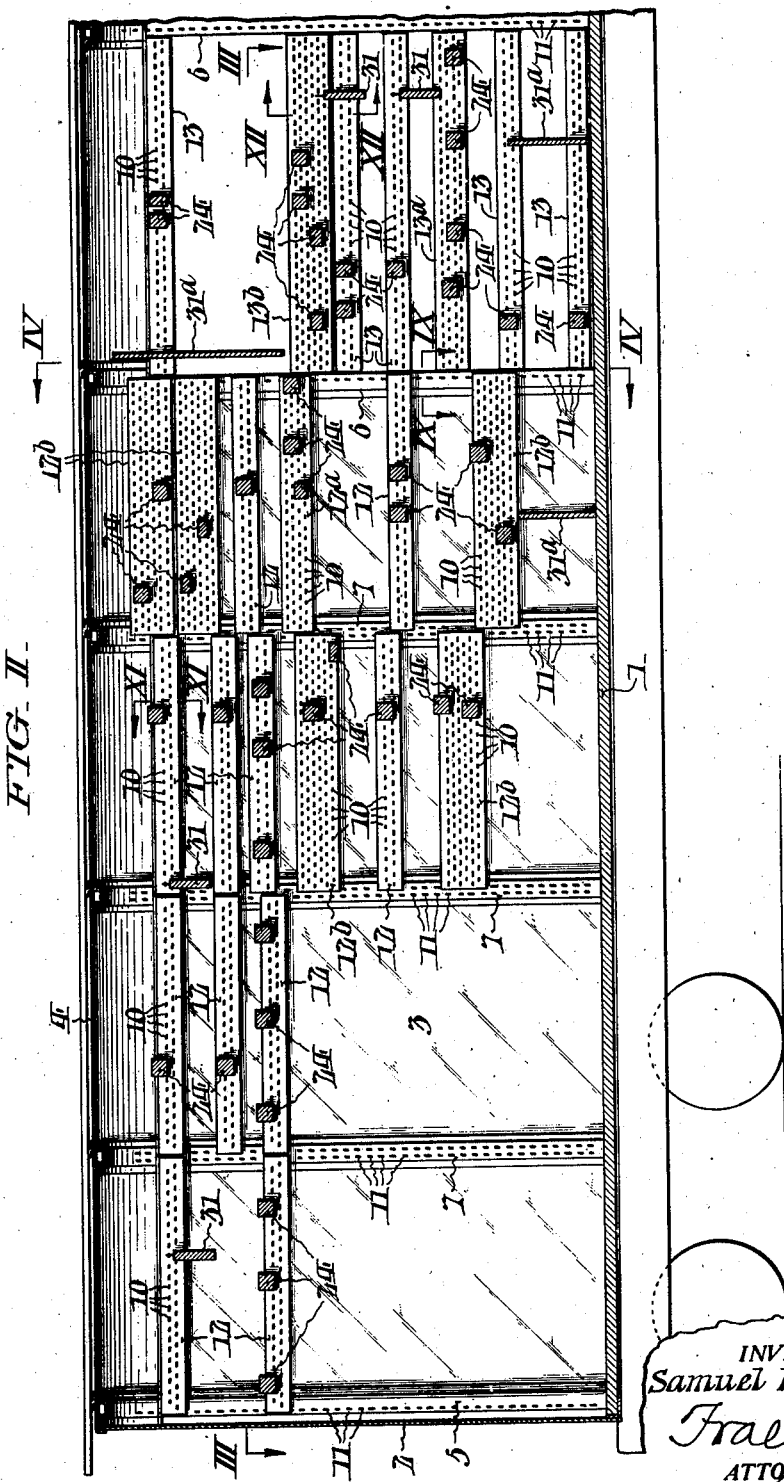

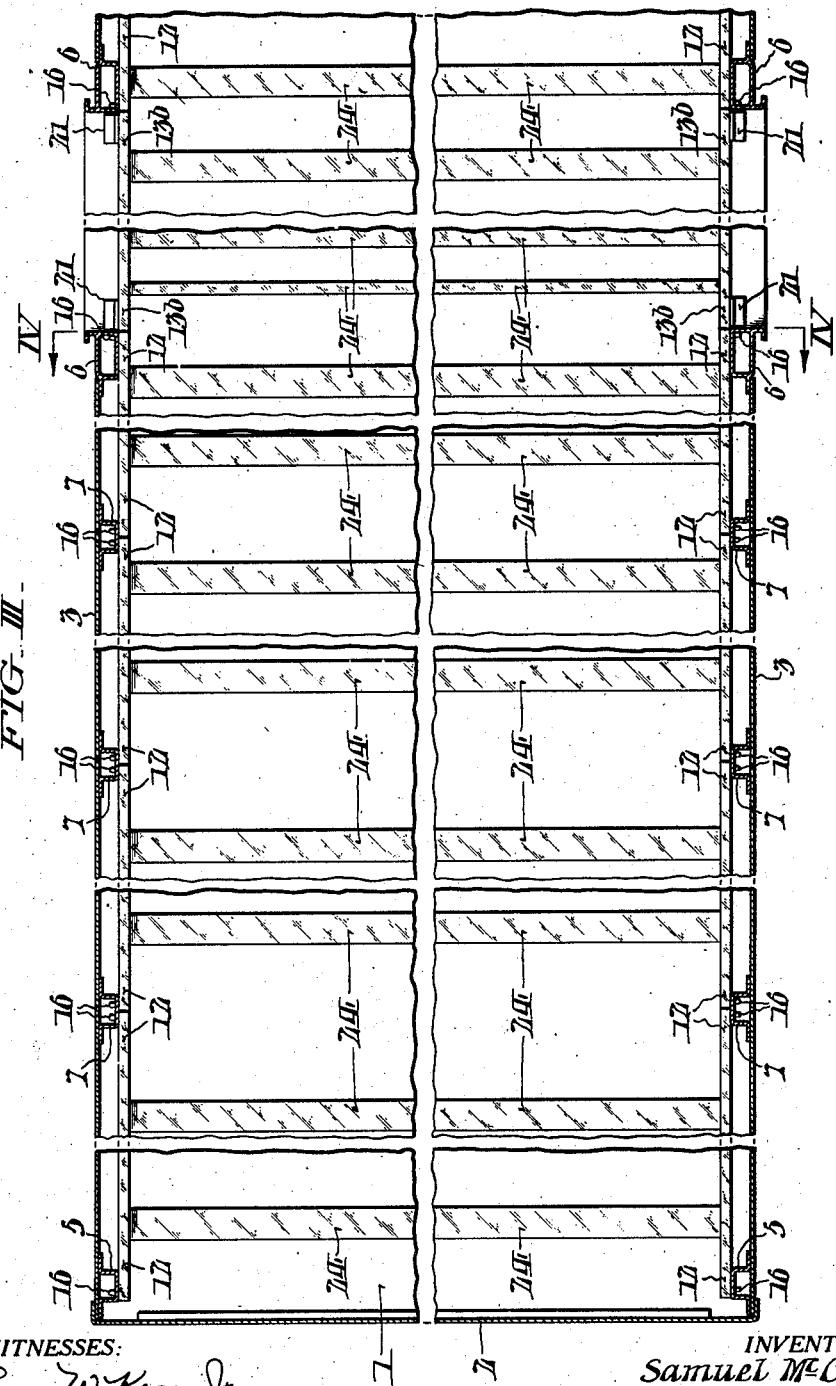

Aug. 31, 1937.                S. McCURDY                2,091,869
                          COMPARTMENT BOX CAR
                           Filed Feb. 3, 1937            5 Sheets-Sheet 4
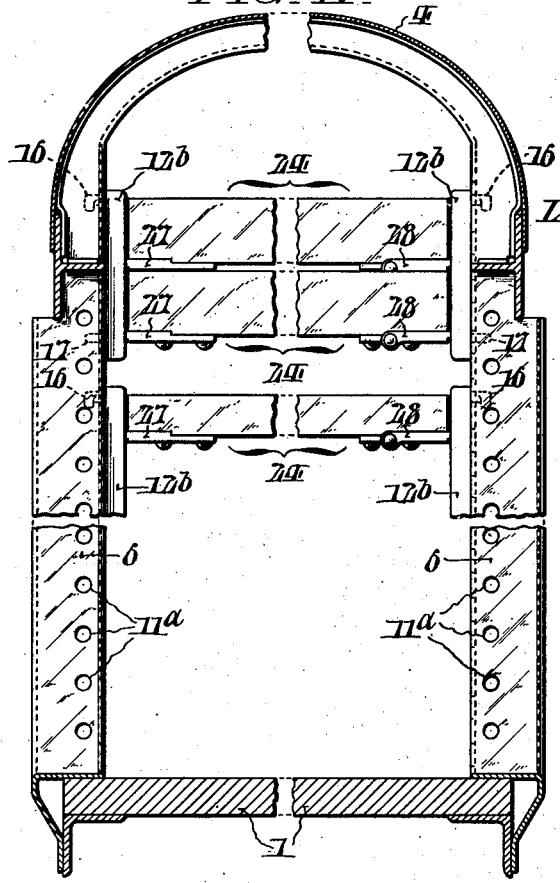
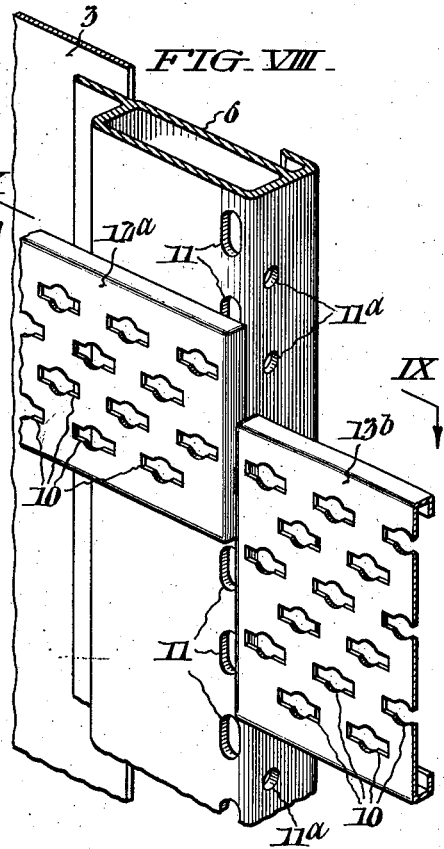
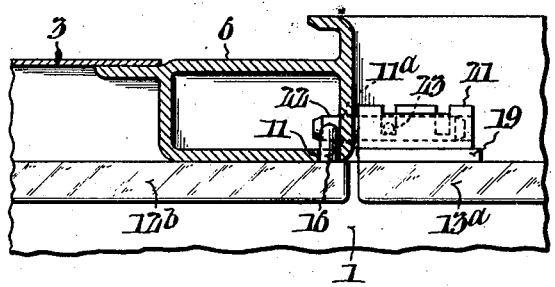
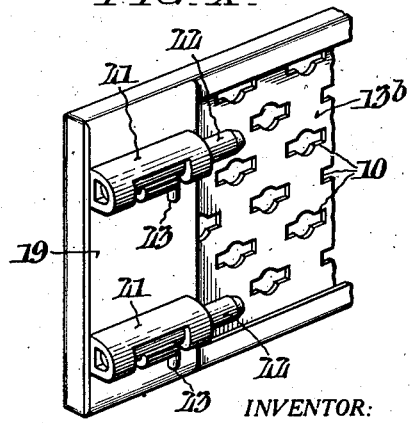
WITNESSES:
Thomas W. Kerr, Jr.
Woodrow Stinson
INVENTOR:
Samuel McCurdy,
BY Fraley Paul
ATTORNEYS.

Aug. 31, 1937.    S. McCURDY    2,091,869
COMPARTMENT BOX CAR
Filed Feb. 3, 1937    5 Sheets-Sheet 5
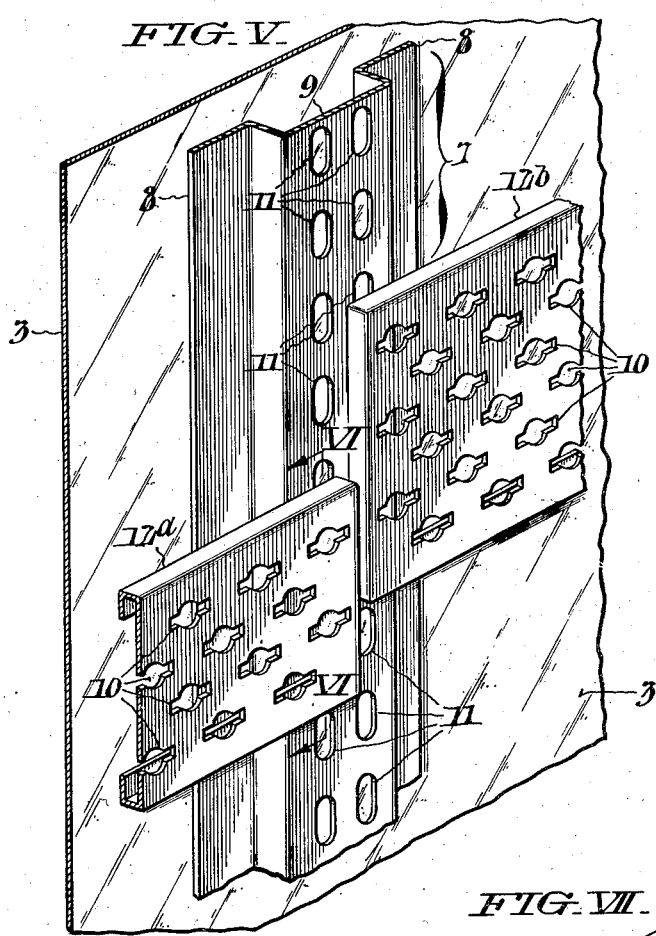
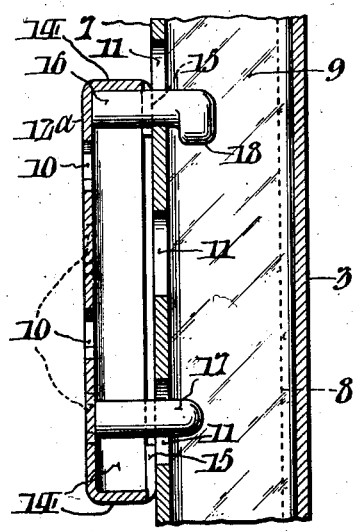
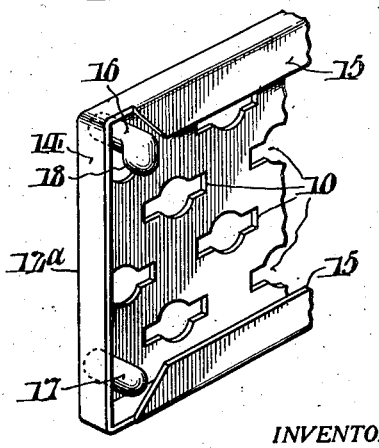
INVENTOR:
Samuel McCurdy,
BY
ATTORNEYS.

Patented Aug. 31, 1937

2,091,869

UNITED STATES PATENT OFFICE 2,091,869

COMPARTMENT BOX CAR

Samuel McCurdy, Ardmore, Pa., assignor to The Pennsylvania Railroad Company, Philadelphia, Pa., a corporation of Pennsylvania Application February 3, 1937, Serial No. 123,793

9 Claims. (Cl. 105—376)

This invention relates to railway box cars, and more particularly to a car adapted for the carriage of automobile parts or other articles of various shapes and sizes which are conveniently shipped in lots of like parts with each lot separately nested and stowed in a compartment of the car. For such a purpose, it is desirable to employ shelves and partitions arranged and spaced depending upon the character of the articles which are shipped, and the car should be so constructed that such shelves and partitions may be applied and adjusted according to the particular conditions encountered.

The principal object of my invention is to provide a car normally adapted to all the ordinary uses of a box car, but capable of ready conversion into a compartment car by the application thereto of various accessories such as side racks, cross bars, shelves and partitions, these accessories being adjustably secured to the car and to each other in such manner that they can be moved from one position to another to take care of the lading most advantageously.

A further object of the invention is to provide interior accessories of the character described which are relatively simple in construction and inexpensive to manufacture, and which nevertheless are of sturdy and efficient construction.

Still another object of the invention is to provide a flexible arrangement for such interior accessories which permits the car to be divided up at will into compartments of the desired number and shape, irrespective of the number and position of the door openings.

Still other objects and advantages characteristic of my invention will become more fully apparent from the description hereinafter set forth of one embodiment or example of the same, having reference to the accompanying drawings. Of the drawings:

Fig. I represents a longitudinal cross section of a compartment box car embodying my invention, showing various articles of lading in diagrammatic outline, and illustrating one of many different arrangements for the partitioning and shelving of the interior of the car.

Fig. II represents an enlarged longitudinal cross section of one end of the car, showing a typical arrangement of side racks and cross bars.

Fig. III represents a sectional plan view of interior portions of the car, taken as indicated by the lines III—III of Fig. II.

Fig. IV represents a cross section, taken as indicated by the lines IV—IV of Figs. II and III.

Fig. V represents an enlarged perspective view showing one of the intermediate side posts and the manner in which the side racks are adjustably secured thereto.

Fig. VI represents an enlarged cross section of the same, taken as indicated by the lines VI—VI of Fig. V.

Fig. VII represents an enlarged perspective view of one end of a side rack.

Fig. VIII represents a perspective view of a door post showing the manner in which the side racks are adjustably secured thereto.

Fig. IX represents a cross section, taken as indicated by the lines IX—IX of Fig. VIII.

Fig. X represents an enlarged perspective view of one end of one of the side racks employed at the door opening.

Fig. XI represents a fragmentary cross section, taken as indicated by the lines XI—XI of Fig. II, and showing the manner in which the cross bars are applied to the car.

Fig. XII represents a similar cross section, taken as indicated by the lines XII—XII of Fig. II, and showing the manner in which a partition is suspended transversely of the car; and, Fig. XIII represents an enlarged perspective view of one of the cross bars.

With reference particularly to Figs. I to IV of the drawings, there is shown a box car which includes a floor 1, end walls 2, side walls 3, and a roof 4. Affixed at the sides of the car are longitudinally spaced posts including end posts 5, door posts 6, and intermediate posts 7. Desirably the end posts 5 and the intermediate posts 7 are of U-shaped or channeled cross section, and, as shown most clearly in Fig. V, they have flanges 8 secured to the side walls 3, and a web portion 9 spaced from the side walls 3. On the other hand, the door posts 6 are preferably of box-shaped cross section, as illustrated in Fig. VIII.

The end posts 5 are provided with a single vertical row of closely spaced perforations 11. The intermediate posts 7 have a double row of such closely spaced perforations 11, the perforations of one row horizontally paralleling those of the other row. The door posts 6 have one row of vertical perforations 11 disposed at the inner face thereof adjacent to the inside corner at the door opening; and another vertical row of special perforations 11a also disposed adjacent to said corner but located in the transverse face of the door post 6 at the door opening.

Side racks 12, 12a, 12b, 13, 13a, 13b, are mounted longitudinally of the car, each bridging a pair of posts 5, 6, 7, and these racks are adjustable vertically so that they may be positioned at the desired locations. The manner in which the side racks 12, 12a, 12b, are constructed is most clearly illustrated in Figs. V, VI and VII. Desirably each such rack constitutes a metal panel flanged at the sides and ends, as indicated at 14, and having rear surfaces 15 merging with the side flanges and paralleling the front face. Such rear surfaces 15 are adapted to abut against the posts 5, 6, 7. Certain of the side racks have a double row of perforations 10 extending in closely spaced relation from end to end and these are designated by the numeral 12. Others have four rows of such perforations 10, and are designated by the numeral 12a. Still others have six rows of such perforations 10, and are designated by the numeral 12b. In each case the perforations 10 of one horizontal row are staggered with respect to the perforations of the adjacent horizontal row or rows. Of course, the particular construction of these side racks 12, 12a, 12b, may vary considerably, and the examples represented in the drawings are merely typical of a preferred arrangement.

For the purpose of adjustably securing the side racks 12, 12a, 12b, in the desired positions within the car, these racks are provided near each end thereof with a holding pin 16 and a guiding pin 17. The holding pin 16 has a downturned end 18, and when a side rack 12, 12a, 12b, is applied to a post, the pin 16 enters a selected perforation 11 in one of the posts, and its downturned end 18 serves to prevent dislodgment. The guiding pin 17 enters a lower perforation 11 and assists in maintaining the side rack in place.

At the door openings, special forms of side racks are employed. Those with a double row of perforations 10 are designated at 13; those with four rows of perforations at 13a; and those with six rows of perforations at 13b. As shown most clearly in Figs. VIII, IX and X, such side racks 13, 13a, 13b, are generally similar in construction to the side racks previously described, but they have at each end a reinforcing plate 19 provided with latch members 21 and movable latch bolts 22 operated by means of a handle 23. The latch bolts 22 are adapted to enter the special perforations 11a in the door posts 6. The construction of the side racks for the door openings is such that these racks are maintained in the same longitudinal plane as the other side racks 12, 12a, 12b, of the car.

Adjustable cross bars 24, shown most clearly in Figs. XI and XIII, are disposed transversely of the car and are supported upon the side racks 12, 12a, 12b, 13, 13a, 13b. Each such cross bar desirably comprises a wooden beam 25 reinforced throughout its length by a metal angle 26. At one end there is provided a fixed bifurcated tongue 27, and at the other end a similarly shaped hinged tongue 28. The tongues 27, 28 are adapted to enter selected perforations 10 of the side racks, and to hold the cross bar 24 in the desired position. In order to apply a cross bar 24, the fixed tongue 27 is first inserted within a perforation 10 at one side of the car, with the cross bar tilted upwardly at an angle, and the hinged tongue 28 is then guided into a perforation 10 at the other side of the car while lowering the cross bar to a horizontal position. The weight of the cross bar maintains it in place. When it is desired to remove a cross bar 24, the end thereof which carries the hinged tongue 28 is lifted, allowing the tongue to withdraw from the perforation 10 engaged by it, and to drop to the position indicated in dot-and-dash lines at 29 in Fig. XI.

In addition to cross bars 24, there are desirably provided cross partitions 31, 31a shown most clearly in Fig. XII. Certain of these cross partitions designated at 31 are suspended by means of links 32 which have keepers 33 engaging the perforations 10 in the side racks. The links 32 are in turn secured to the cross partitions 31 by means of bolts 34. The cross partitions 31 may be supplied in various sizes to suit the particular conditions which are encountered. Other such cross partitions designated at 31a are unattached and are merely used as spacing members.

At times it is desirable to employ horizontal shelves 35, and such shelves are illustrated in Fig. I. Where these shelves 35 are provided, they are supported at proper intervals by cross bars 24. Obviously the arrangement of cross partitions 31 and shelves 35 can be considerably varied to divide and subdivide the interior of the car into compartments of the desired cubical capacity for stowing lots of articles independently of other lots.

It will be particularly noted that the arrangement of the side racks 12, 12a, 12b, 13, 13a, 13b, is such that collectively the side racks extend in adjoining relation and in a common plane from one end of the car to the other, and collectively these racks may be positioned to cover any desired portion of the side walls or door openings. In order to make it possible to apply the cross bars 24 at any desired point in the car, the side racks 12, 12a, 12b, which bridge the intermediate posts 7, terminate at points centrally between the double rows of perforations 11 of such intermediate posts 7. This makes it possible to adjust the side racks so as to supply a perforation 10 at any point in the side wall of the car. Moreover, the special side racks 13, 13a, 13b, employed at the door opening are designed to terminate adjacent the inside corner of the door posts 6, and this arrangement obviates any difficulties which might otherwise be encountered at the door openings.

It will also be observed that in the illustrated example, the side posts 5, 6, 7, form integral parts of the side frames of the car. Such posts, therefore, serve in the dual capacity of furnishing strength to the car and at the same time they afford a means for attachment of the side racks. Whenever it is desired to remove the interior accessories and to use the car as an ordinary box car, the removal of such accessories gives the car the full capacity between the side walls which is desired for a box car.

While I have described my invention with reference to one example thereof, it will be apparent that the form of the interior accessories provided for furnishing the desired shelving and partitioning admits of infinite variations to suit the needs of the shipper, and that the special detailed construction herein described with particularity is merely representative of one convenient arrangement for such accessories. My invention contemplates many changes in the illustrated construction without departing from the spirit thereof as defined in the annexed claims.

Having thus described my invention, I claim:
1. In a railway box car, longitudinally spaced posts affixed at the sides of the car and having perforations extending substantially from the floor to the roof, vertically adjustable side racks bridging adjacent posts and having projections engaging selected perforations of said posts, said side racks being adapted collectively to extend in adjoining relation from one end of the car to the other, and each side rack having perforations extending therealong from end to end, and adjustable cross bars disposed transversely of the car and having projections at the ends thereof engaging selected perforations of said side racks.

2. In a railway box car, longitudinally spaced posts affixed at the sides of the car including posts defining door openings, all of said posts having perforations extending substantially from the floor to the roof, vertically adjustable side racks bridging adjacent posts and having projections engaging selected perforations of said posts, said side racks being adapted collectively to cover any portion of the side walls or door openings of the car, and each side rack having perforations extending therealong from end to end, and adjustable cross bars disposed transversely of the car and having projections at the ends thereof engaging selected perforations of said side racks.

3. In a railway box car, longitudinally spaced perforated posts affixed at the sides of the car including end posts, door posts and intermediate posts, adjustable side racks bridging adjacent pairs of said posts and having projections engaging selected perforations of said posts and adapted collectively to extend in adjoining relation from one end of the car to the other, all of said side racks including those between the door posts being disposed in a common longitudinal plane, and each side rack having perforations extending therealong from end to end, and adjustable cross members disposed transversely of the car and having projections at the ends thereof engaging selected perforations of said side racks.

4. In a railway box car, longitudinally spaced perforated posts affixed at the sides of the car including end posts, door posts and intermediate posts, adjustable side racks bridging adjacent pairs of said posts and having projections engaging selected perforations of said posts and adapted collectively to extend in adjoining relation from one end of the car to the other, all of said side racks including those between the door posts being disposed in a common longitudinal plane, and each side rack having a plurality of horizontal rows of closely spaced perforations extending therealong from end to end with the perforations of one row staggered with relation to the perforations of an adjacent row, and adjustable cross members disposed transversely of the car and having projections at the ends thereof engaging selected perforations of said side racks.

5. In a railway box car, longitudinally spaced posts affixed at the sides of the car including perforated end posts, perforated door posts, and intermediate posts having a double row of perforations extending substantially from the floor to the roof, vertically adjustable perforated racks bridging adjacent posts and having projections engaging selected perforations of said posts, said racks being adapted collectively to cover any portion of the side walls or door openings of the car, and certain of said racks terminating at said intermediate posts between the double row of perforations therein, and adjustable cross bars disposed transversely of the car and having projections at the ends thereof engaging selected perforations of said racks.

6. In a railway box car, longitudinally spaced posts affixed at the sides of the car including perforated end posts, perforated door posts and perforated intermediate posts, each said door post having two vertical rows of perforations disposed adjacent to and one on each side of the inside corner thereof at the door opening, vertically adjustable perforated side racks bridging adjacent posts and having projections engaging selected perforations of said posts, the side racks at said door opening terminating at said inside corner of the door post and being disposed in the same longitudinal plane with the other side racks, and adjustable cross bars disposed transversely of the car and having projections at the ends thereof engaging selected perforations of said side racks.

7. In a railway box car, longitudinally spaced posts forming parts of the side frames of the car, said posts being channel shaped with their webs spaced inwardly from the side walls and having perforations in the webs thereof extending substantially from the floor to the roof of the car, vertically adjustable side racks bridging adjacent posts and having projections engaging selected perforations of said posts, and horizontally and vertically adjustable cross bars disposed transversely of the car and having projections at the ends thereof engaging selected perforations of said side racks.

8. In a railway box car, longitudinally spaced posts forming parts of the side frames of the car, said posts being of U-shaped cross-section, and each having a web portion spaced inwardly from the side walls of the car with two vertical rows of perforations therein, vertically adjustable side racks bridging adjacent posts and engaging selected perforations of said posts, said side racks terminating between said rows of perforations and said side racks having perforations extending therealong from end to end, and adjustable cross bars disposed transversely of the car and having projections at the ends thereof engaging selected perforations of said side racks.

9. In a railway box car, longitudinally spaced posts at the sides of the car, each having a vertical row of perforations therein, vertically adjustable side racks bridging adjacent posts and having projections engaging perforations of said posts, said side racks comprising panels with side and end flanges merging into rear surfaces paralleling the front face and adapted to abut against said posts and each side rack having perforations extending from end to end, and adjustable cross bars disposed transversely of the car and having projections at the ends thereof engaging selected perforations of said side racks.

SAMUEL McCURDY.